United States Patent Office 3,489,839
Patented Jan. 13, 1970

3,489,839
ANTI-TOXOPLASMIC PROCESS USING DIPHENYL SULFONES
Satoshi Ohshima, Suginami-ku, Tokyo, Hidefumi Tanaka, Nerima-ku, Tokyo, Yoshiharu Inami, Bunkyo-ku, Tokyo, and Masahiko Seto, Urawa-shi, Saitama-ken, Japan, assignors to Tanabe Seiyaku Co., Ltd., Osaka, Japan, a corporation of Japan
No Drawing. Continuation of application Ser. No. 591,667, Oct. 19, 1966. This application Dec. 16, 1968, Ser. No. 785,453
Claims priority, application Japan, Oct. 23, 1965, 40/65,187
Int. Cl. A61k 27/00, 21/00
U.S. Cl. 424—321                           3 Claims

ABSTRACT OF THE DISCLOSURE

A method for the protection of warm blooded animals against Toxoplasma protozoa comprising the administration of certain diphenyl sulfones.

---

This application is a continuation of Ser. No. 591,667 filed Oct. 19, 1966, now abandoned.

This invention relates to anti-toxoplasmic composition for warm-blooded animals. More particularly, this invention relates to such a composition containing a diphenylsulfone compound having the general formula:

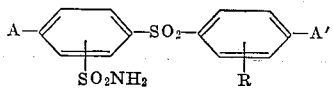

wherein one of A or A' is an amino group and the other is taken from the class consisting of acetoamido or nitro groups; and R is hydrogen or sulfamoyl group.

Toxoplasmosis, which is induced by parasitism and proliferation of Toxoplasma protozoa; namely, *Toxoplasma gondii*, is commonly known as an infectious disease of both warm-blooded animals and human beings. The disease is most destructive and causes very large annual losses of animals; for example, hepatitis in dogs and cats and abortion and premature births in sheep and cattle. Furthermore, the disease sometimes causes abortion, still births and monstrum in human beings.

However, there are no compounds known which are effective in treating, curing or controlling Toxoplasmosis without harmful side effects. For example, pyrimethamine (2,4-diamino-5-parachlorophenyl-6-ethyl-pyrimidine), which is known as an anti-toxoplasmic or an anti-malarial, is so toxic ($LD_{50}$ (i.p.)=about 30 mg./kg.) that it cannot be successfully used for this purpose. Several sulfa drugs such as sulfamerazine, sulfadiazine, sulfamethadine and sulfamonomethoxine are also considered to be effective, but they are always accompanied by an undesirable loss of appetite.

We have found that the aforementioned diphenylsulfone compounds are useful as anti-toxoplasmics of remarkably reduced toxicity as compared to the known anti-toxoplasmic agents.

The representative compounds of said diphenylsulfone compounds of the present invention are as follows:

(A) 4,4'-diamino-diphenylsulfone-2-sulfonamide
(B) 4-amino-4'-acetamido-diphenylsulfone-2-sulfonamide
(C) 4-nitro-4'-amino-diphenylsulfone-2-sulfonamide
(D) 4-nitro-4'-acetamido-diphenylsulfone-2-sulfonamide
(E) 4,4'-diamino-diphenylsulfone-3-sulfonamide
(F) 4,4'-diamino-diphenylsulfone-3,3'-disulfonamide According to the present invention, warm-blooded animals are protected against Toxoplasma protozoa by administering the diphenylsulfone compounds. It is convenient to administer the composition by mixing it with their feed or water, although compulsory administration is also possible. Non-per os administration, such as intramuscular injection, subcutaneous injection, intraperitoneal injection or intravenous injection is also preferred. In particular, intramuscular injection is preferable for cattle and pigs, and intraperitoneal or subcutaneous injections are preferable for dogs and cats.

The optimum dose of these compounds is between about 10 mg. and 50 mg. per kg. of body weight daily. However, the dose may be modified in consideration of the degree of growth and syndrome of the subjects and the toxic power of protozoan parasite. The administration of large amounts up to about 200 mg./kg./day is possible without causing harmful side effects. It has been found to be better to administer the compound in successive doses over a period of several days than to give a large amount at one time.

For the purpose of oral administration, the diphenylsulfone compound and pharmaceutically-acceptable excipients such as lactose, glucose, etc., in the forms of powders or tablets, are convenient. For non-per os administration, solutions containing a water-soluble neutral salt of the compound in a vehicle such as distilled water, injectable glucose solution, or injectable biological sodium chloride solution, are preferable. However, the water insoluble diphenylsulfone compound may be injected in a form of aqueous suspension with an emulsifier such as methylcellulose, sodium alginate, or the like.

According to an embodiment of this invention, pyrimethamine may be used for synergistic effect with the diphenylsulfone compounds. The synergistic action of pyrimethamine is so significant that animals can be protected completely from Toxoplasmosis by administering a small amount of the compounds. For example, the administration of a mixture containing 2.5 mg. of pyrimethamine and 5.0 mg. of 4,4'-diamino-diphenylsulfone-2-sulfonamide per kg. daily corresponds to the administration of 100 mg./kg./day of 4,4'-diaminodiphenylsulfone-2-sulfonamide. When the composition containing pyrimethamine and the diphenylsulfone compound are employed as active ingredients is to be used, the amount of pyrimethamine to be administered is preferably less than about 6 mg./kg. and the desirable relative ratio of pyrimethamine is lower than about 50 parts per 100 parts of the diphenylsulfone compound in order to minimize the side effect of pyrimethamine on the subjects. Under such circumstances, the greater the ratio of pyrimethamine in the composition, the more curative dose of the composition decreases.

In our test for anti-toxoplasmic activity on *Toxoplasma gondii* RH strain, the composition of this invention showed excellent results on warm-blooded animals against said protozoa. For example, the administration of between 12.5–100 mg./kg./day of 4,4'-diamino-diphenylsulfone-2-sulfonamide and 6.25–0/8 mg./kg./day of pyrimethamine has achieved 100% cures of Toxoplasmosis as described in Experiment 2. The successful results of our experiments are quite surprising in comparison with the prior methods where such high percentages of cures have never been achieved.

Although it is convenient to administer the diphenylsulfone compound and pyrimethamine in the form of a mixture, both ingredients can also be administered at different times in the form of separate preparations.

Furthermore, for the purpose of treating general symptoms and complications, various other drugs, for example, sulfa drugs, antiseptics, anti-mold substances, antihistaminic agents, anti-inflammatory agents, etc., may be used in conjunction with the active compounds of this invention either simultaneously or separately.

Three compounds among the diphenylsulfone compounds of the present invention, namely, 4-nitro-4'-acetamido - diphenylsulfone-2-sulfonamide, 4-amino-4'-acetamido-diphenylsulfone-2-sulfonamide and 4,4'-diamino-diphenylsulfone-2-sulfonamide are described in U.S. Patent No. 2,358,365. However, the anti-toxoplasmic activity of the above compounds was neither suggested in said U.S. patent specification nor has it been known elsewhere hitherto. The other diphenylsulfone compounds of the present invention, for example, 4,4'-disubstituted-diphenylsulfone-3-sulfonamides and 4,4'-disubstituted-diphenylsulfone-3,3'-disulfonamides are a series of novel compounds in themselves. The 4,4'-disubstituted-diphenylsulfone-3-sulfonamide can be prepared by reacting sodium 4-substituted-benzenesulfonate with 2-substituted-5-chloro-benzenesulfonamide. The 4,4'-disubstituted-diphenylsulfone-3,3'-disulfonamide can be prepared by reacting sodium 4-substituted-3-sulfamoyl-benzene-sulfonate with 2-substituted - 5 - chloro-benzenesulfonamide. Thus, the other diphenylsulfone compounds can be prepared by reacting the corresponding sodium benzenesulfonate compounds with the corresponding chlorobenzenesulfonamide compounds, respectively.

The following detailed experiments will further illustrate the invention but are not to be considered as any limitation thereof.

EXPERIMENT 1

Each mouse (dd strain, female, body weight 20–22 g.) was inoculated with 20,000 *Toxoplasma gondii* RH strain. After 2–3 hours, the mice were injected intraperitoneally with an aqueous solution containing one of the compounds of this invention. The injection was repeated at intervals of 24 hours for 6 days. The percentages of survivors after 10, 15 and 20 days, and the average number of days each mouse survived were noted and calculated. The compounds, dosages, etc., and results are tabulated on Table I. Note that sulfamonomethoxine and pyrimethamine were used as controls.

TABLE I

| Compounds | Dose (mg./kg./day) | Numbers of mice | Percentage of Survivors Over 10 days | Over 15 days | Over 20 days | Average of surviving days |
|---|---|---|---|---|---|---|
| (A) | 25 | 20 | 80 | 0 | 0 | 12.3 |
| (A) | 50 | 20 | 100 | 70 | 20 | 15.9 |
| (A) | 100 | 20 | 100 | 80 | 50 | 19.8 |
| (B) | 100 | 10 | 100 | 80 | 60 | 15.4 |
| (B) | 100 | 10 | 80 | 20 | 0 | 9.6 |
| (C) | 100 | 10 | 100 | 40 | 0 | 13.4 |
| (D) | 100 | 10 | 100 | 80 | 20 | 16.0 |
| (E) | 100 | 10 | 100 | 80 | 20 | 15.8 |
| (F) | 100 | 10 | 100 | 80 | 20 | 14.0 |
| Sulfamonomethoxine | 100 | 20 | 100 | 20 | 0 | 14.0 |
| Pyrimethamine | 12.5 | 10 | 80 | 20 | 0 | 11.2 |
| None | | 20 | 0 | 0 | 0 | 6.6 |

EXPERIMENT 2

The experiment as described in Experiment 1 was repeated using an aqueous solution of Compound A (see column 1, line 64) and pyrimethamine as set forth in Table II. In addition to the data calculated in Experiment 1, curative percentages were figured as to any survivors after 40 days. This was done by subinoculating the brain homogenate into clean mice to confirm the absence of living protozoa. If no mice survived after 40 days, the average surviving days were calculated instead. The results of this experiment are shown in Table II.

TABLE II

| Dose (mg./kg./day) Compound A | Pyrimethamine | Numbers of mice | Percentage of survivors Over 10 days | Over 15 days | Over 20 days | Over 25 days | Average of surviving days | Curative percentage |
|---|---|---|---|---|---|---|---|---|
| 0 | 0 | 30 | 0 | 0 | 0 | 0 | 7.0 | 0 |
| 25 | 0 | 10 | 35 | 0 | 0 | 0 | 9.25 | 0 |
| 50 | 0 | 20 | 100 | 40 | 0 | 0 | 13.0 | 0 |
| 100 | 0 | 20 | 100 | 85 | 40 | 25 | | 10 |
| 0 | 6.25 | 10 | 50 | 10 | 0 | 0 | 10.0 | 0 |
| 0 | 12.5 | 10 | 100 | 20 | 0 | 0 | 12.6 | 0 |
| 2.5 | 1.25 | 10 | 100 | 10 | 0 | 0 | 11.4 | 0 |
| 5.0 | 0.625 | 10 | 100 | 0 | 0 | 0 | 11.3 | 0 |
| 5.0 | 1.25 | 10 | 80 | 20 | 0 | 0 | 12.3 | 0 |
| 5.0 | 2.5 | 10 | 100 | 70 | 50 | 20 | | 10 |
| 10 | 0.3125 | 10 | 100 | 30 | 0 | 0 | 13.4 | 0 |
| 10 | 0.625 | 10 | 100 | 50 | 0 | 0 | 14.2 | 0 |
| 10 | 1.25 | 10 | 100 | 70 | 30 | 0 | 17.8 | 0 |
| 10 | 2.5 | 10 | 100 | 100 | 80 | 80 | | 80 |
| 25 | 0.2 | 10 | 100 | 20 | 0 | 0 | 13.2 | 0 |
| 25 | 0.4 | 10 | 100 | 50 | 0 | 0 | 14.6 | 0 |
| 25 | 0.8 | 10 | 100 | 100 | 50 | 50 | | 50 |
| 50 | 0.05 | 10 | 100 | 40 | 0 | 0 | 13.5 | 0 |
| 50 | 0.1 | 10 | 100 | 50 | 0 | 0 | 14.6 | 0 |
| 50 | 0.2 | 10 | 100 | 90 | 10 | 0 | 16.7 | 0 |
| 50 | 0.4 | 10 | 100 | 100 | 40 | 40 | | 40 |
| 50 | 0.8 | 10 | 100 | 100 | 60 | 60 | | 60 |
| 100 | 0.05 | 10 | 100 | 100 | 30 | 0 | 18.5 | 0 |
| 100 | 0.1 | 10 | 100 | 100 | 40 | 10 | | 10 |
| 100 | 0.2 | 10 | 100 | 100 | 70 | 50 | | 50 |
| 100 | 0.4 | 10 | 100 | 100 | 90 | 90 | | 90 |
| 100 | 0.8 | 10 | 100 | 100 | 100 | 100 | | 100 |
| 12.5 | 6.25 | 10 | 100 | 100 | 100 | 100 | | 100 |
| 25 | 6.25 | 10 | 100 | 100 | 100 | 100 | | 100 |
| 50 | 6.25 | 10 | 100 | 100 | 100 | 100 | | 100 |

EXPERIMENT 3

$2 \times 10^7$ of *Toxoplasma gondii* HG strain isolated from spontaneously-infected pigs was inoculated intraperitoneally to each of the pigs (Yorkshire strain, body weight 15–24 kg.) after it was confirmed that they had no antibodies against Toxoplasma protozoa. Then, an aqueous solution containing 4,4'-diamino-diphenylsulfone-2-sulfonamide (Compound A) was injected intramuscularly. Febrile condition and the general symptoms of the pigs were observed and the protozoa in the tissues of the survivors were also examined anatomically after 40 days from the first injection. Sulfaminomethoxine and pyrimethamine were employed as controls. The results are shown in Table III.

The foregoing experiments are intended to be illustrative only.

TABLE III

| Compound injected | Intervals from infection to treatment, days | Dose (mg./kg./day×days) | Pyrogenetic stage of over 40° C., days | General symptom | Toxoplasma detected in organotissues | | | | | | | | | |
|---|---|---|---|---|---|---|---|---|---|---|---|---|---|---|
| | | | | | Brain | Diaphragm | Liver | Kidney | Spleen | Lung | Pancreas | Lymphatic glands | Myocardium | Intercostal muscle |
| Compound A | 0 | 30×7 | 3 | Anorexia in pyrogenetic stage. | | | | | | | | | | |
| Do | 0 | 30×7 | 1 | ...do... | | | | | | | | | | |
| Do | 0 | 30×3 | 1 | ...do... | | | | | | | | | | |
| Do | 0 | 30×3 | 2 | ...do... | | | | | | | | | | |
| Do | 0 | 15×7 | 3 | ...do... | | | | | | | | | | |
| Do | 0 | 15×7 | 3 | ...do... | | | | | | | | | | |
| Do | 0 | 15×7 | 2 | ...do... | | | | | | | | | | |
| Do | 3 | 30×7 | 2 | ...do... | | | | | | | | | | |
| Do | 3 | 30×7 | 4 | ...do... | | | | | | | | | | |
| Do | 3 | 30×7 | 4 | ...do... | | | | | | | | | | |
| Do | 3 | 30×3 | 3 | ...do... | | | | | | | | | | |
| Do | 3 | 30×3 | 3 | ...do... | | | | | | | | | | |
| Do | 3 | 30×3 | 2 | ...do... | | | | | | | | | | |
| Do | 6 | 30×7 | 4 | ...do... | | | | | | | | | | |
| Do | 6 | 30×7 | 5 | ...do... | | | | | | | | | | |
| Sulfamono-methoxine. | 0 | 60×7 | 2 | ...do... | + | | | | | | | | + | + |
| Pyrimethamine. | 3 | 1×7 | 16 | Death after 17 days. | + | + | + | + | + | + | | | + | + |
| None | | | 7 | Anorexia, diarrhea and cough. | + | + | + | | + | + | | | + | + |
| Do | | | 45 | Anorexia, constipation and cyanosis. | + | + | + | + | + | + | + | + | + | + |
| Do | | | 17 | Anorexia, diarrhea and cyanosis. | + | + | + | | + | | + | + | + | + |

EXPERIMENT 4

To the mice infected by Beverley strain of chronic-type of Toxoplasma protozoa, an aqueous solution containing 4,4'-diamino-diphenylsulfone-2-sulfonamide (Compound A) was injected intraperitoneally once a day for 7 consecutive days before or after the infection. Toxoplasma protozoa was detected by counting cysts in brain of survivors of over 45 days. The brain of mice in which no cyst was detected, was homogenized and the homogenate was further subinoculated to the other clean mice and examined whether symptoms of toxoplasmosis was induced or not induced by the sub-inoculation. The case which induced no sympton by the sub-inoculation was regarded as complete cure. The results are shown in Table IV. (10 mice were grouped to a test and sulfaminomethoxine was employed as control.)

What we claim is:

1. A process for protecting warm-blooded animals against Toxoplasma protozoa which comprises administering to a warm-blooded animal suffering from toxoplasmosis an effective anti-toxoplasmosis amount of a compound represented by the formula:

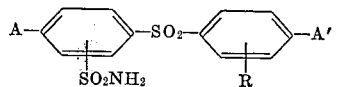

wherein one of A or A' is amino or acetamido and the other is amino, acetamido or nitro and R is hydrogen or sulfamoyl.

2. A process according to claim 1 wherein said compound is 4,4'-diamino-diphenylsulfone-2-sulfonamide, 4 amino-4' acetamido-diphenylsulfone-2 sulfonamide, 4 nitro-4' amino-diphenylsulfone-2 sulfonamide, 4-nitro-4'-

TABLE IV

| Compounds | Starting of treatment | Dose (mg./kg./day) | Estimated numbers of cysts in brain | | | | No symptom observed in sub-inoculated mice |
|---|---|---|---|---|---|---|---|
| | | | >10,000 | 1,000–10,000 | <1,000 | None — Toxoplasmosis induced by sub-inoculation | |
| Compound A | A day before infection | 50 | | | 3 | | 7 |
| | | 100 | | | | 1 | 9 |
| | | 200 | | | | | 10 |
| | Immediately after infection | 50 | | 2 | 1 | 2 | 5 |
| | | 100 | | | 1 | | 9 |
| | | 200 | | | | | 10 |
| Sulfamono-methoxine | A day before infection | 50 | | 1 | 5 | 4 | |
| | | 100 | | | 5 | 5 | |
| | | 200 | | 1 | 3 | 4 | 2 |
| | Immediately after infection | 50 | | 1 | 6 | 3 | |
| | | 100 | | 2 | 4 | 3 | |
| | | 200 | | | 4 | | 1 |
| None | | | 2 | 6 | 4 | 1 | 2 |
| | | | | | | | (*) |

*One mouse died within 45 days.

acetamido-diphenylsulfone-2 sulfonamide, 4,4'-diamino-diphenylsulfone-3-sulfonamide, or 4,4'-diamino-diphenylsulfone-3,3'-disulfonamide.

3. A process according to claim 1 wherein said compound is 4,4'-diamino-diphenylsulfone-2-sulfonamide.

References Cited

UNITED STATES PATENTS 2,358,365  9/1944  Tullar _____ 424—321

OTHER REFERENCES

Roblin et al., J.A.C.S., vol. LXIII, July–December 1941, pp. 1930–1934.

ALBERT T. MEYERS, Primary Examiner

J. D. GOLDBERG, Assistant Examiner